United States Patent
Piepenbrink et al.

(10) Patent No.: US 6,402,648 B1
(45) Date of Patent: Jun. 11, 2002

(54) DEVICE FOR CONTROLLING A CONTINUOUSLY VARIABLE AUTOMATIC TRANSMISSION

(75) Inventors: Andreas Piepenbrink, Meersburg; Bernd Fessler, Kressbronn, both of (DE)

(73) Assignee: ZF Batavia, L.L.C., Batavia, OH (US)

( * ) Notice: Subject to any disclaimer, the term of this patent is extended or adjusted under 35 U.S.C. 154(b) by 0 days.

(21) Appl. No.: 09/596,661

(22) Filed: Jun. 19, 2000

(30) Foreign Application Priority Data

Jul. 23, 1999 (DE) .......................... 199 34 698

(51) Int. Cl.[7] .................. F16H 59/00; F16H 61/00; F16H 63/00
(52) U.S. Cl. ............................. 474/28; 474/28
(58) Field of Search .................... 474/18, 29, 28, 474/35, 17, 12; 477/38, 48, 45, 46; 73/118.2, 117.3, 116

(56) References Cited

U.S. PATENT DOCUMENTS

| | | | | |
|---|---|---|---|---|
| 4,857,034 A | * | 8/1989 | Kouno et al. | 474/28 |
| 5,232,406 A | * | 8/1993 | Sato | 474/28 |
| 5,766,105 A | * | 6/1998 | Fellows et al. | 474/28 |
| 5,961,408 A | * | 10/1999 | Konig et al. | 474/28 |
| 5,993,338 A | * | 11/1999 | Kato et al. | 474/28 |
| 6,126,138 A | * | 3/2000 | Tsai | 474/18 X |

FOREIGN PATENT DOCUMENTS

| | | |
|---|---|---|
| DE | 42 34 103 A1 | 4/1993 |
| DE | 197 21 027 A1 | 11/1998 |
| EP | 0 289 290 A1 | 11/1988 |

\* cited by examiner

*Primary Examiner*—David A. Bucci
*Assistant Examiner*—Marcus Charles
(74) *Attorney, Agent, or Firm*—Davis & Bujold, P.L.L.C.

(57) ABSTRACT

The device to control a continuously variable automatic transmission (CVT) having a first bevel pulley pair, upon an input shift and a second bevel pulley pair upon an output shaft and a belt drive organ extending between the bevel pulley pairs, wherein the movable parts of the bevel pulley pairs are displaced in an axial direction by electromagnetic actuators and hydraulic pressure regulating valves, as well as adjusting cylinders, comprises a closed hydraulic circuit regulated at a constant pressure so that leakage flows of the adjusting cylinders for the bevel pulley pairs and leakage flows of the pressure-regulating valves are delivered directly to a hydraulic constant pressure circuit such as the circuit provided for supplying the torque converter and to the secondary circuit serving for lubrication.

11 Claims, 2 Drawing Sheets

DEVICE FOR CONTROLLING A CONTINUOUSLY VARIABLE AUTOMATIC TRANSMISSION

This invention relates to a device to control a continuously variable automatic transmission (CVT) which is particularly adequate for installation in a motor vehicle.

BACKGROUND OF THE INVENTION

A CVT is a continuous transmission with a first bevel pulley pair upon an input shaft and a second bevel pulley pair upon an output shaft, each bevel pulley pair consisting of a first pulley stationary in the axial direction and a second bevel pulley movable in the axial direction (the primary pulley and secondary pulley, respectively). Between the bevel pulley pairs extends a belt drive organ such as a pushing linked band. The primary pulley and secondary pulley are adjusted by a pressure medium with the aid of an electronic control unit which controls the pressure level of the primary and secondary pulleys via electromagnetic actuators and hydraulic valves.

DE-OS 42 34 103 disclosed a device to control the pressure of the primary pulley. The device comprises an electromagnetically controlled primary valve and a hydraulic secondary valve. The primary valve is controlled by an electronic control unit. If the line from the electronic control unit of the primary valve is interrupted, the device changes over to emergency operation. The pressure level of the primary pulley is then determined by the secondary valve. The position of the secondary valve, in turn, is determined by the primary pulley via a mechanical clutch.

The hydraulic shifting circuit for such a CVT usually has one pump which, from a tank serving as a lubricant sump, conveys the pressure medium to the lines provided with pressure-reducing and pressure-regulating valves through which lines, among others, the adjusting cylinders for the primary pulley and secondary pulley are filled with pressure medium. The leakage flows which appear during adjustment of the primary and secondary pulleys pressurelessly flow back to the tank, the same as the leakage flows appearing in the pressure regulators, and are again returned by the pump, via a filter, to the hydraulic circuit. In the prior art, the known pressure regulators work in the range from 0 to 6 bar at an operating pressure of 8 bar.

The problem solved by the invention is based on increasing the efficiency and reducing the construction expenses of a hydraulic circuit for a CVT, in particular for a belt with bevel pulley transmission.

SUMMARY OF THE INVENTION

According to the invention, it is proposed that the hydraulic circuit be a closed hydraulic circuit with a constantly regulated pressure so that leakage flow currents from the primary pulley and secondary pulley, as well as the pressure regulators, no longer be delivered to the tank, but e.g. directly to the secondary circuit, or to a constant pressure system that supplies the hydrodynamic torque converter and the lubrication.

BRIEF DESCRIPTION OF THE DRAWINGS

The invention is explained in detail with reference to the drawings which show.

DESCRIPTION OF THE PREFFERED EMBODIMENTS

Figure 1:
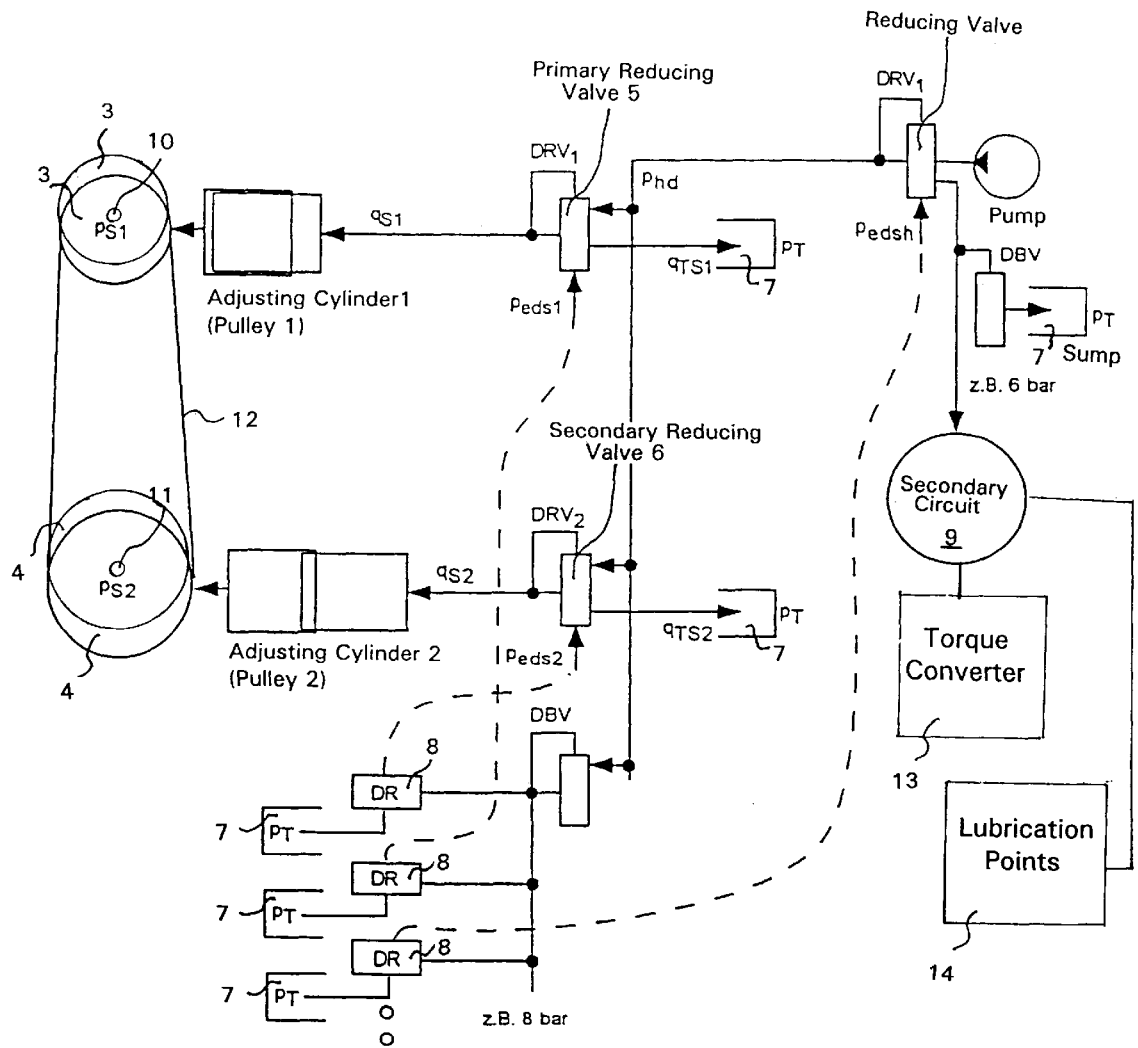
FIG. 1 is a simplified diagram of a conventional pressureless hydraulic circuit.

Both representations for the hydraulic control of a CVT transmission in the design of a belt 12 with a bevel pulley transmission for a motor vehicle is shown only diagrammatically and very simplified, to make understanding the invention easier. FIG. 1 shows a conventional pressureless hydraulic circuit where both adjusting cylinders 1 and 2, for the primary pulley pair 3 and secondary pulley pair 4 are loaded via corresponding lines and pressure-reducing valves 8. The hydraulic circuit is connected on one side with a tank 7 serving as a lubricant sump to which pressurelessly return the leakage flows of the adjusting cylinders 1 and 2, respectively, of the primary pulley pair 3 and secondary pulley pair 4, as well as the leakage flows of the pressure-regulating valves DBV. In its other section, the hydrodynamic circuit is connected with a hydraulic secondary circuit 9 which supplies a hydrodynamic torque converter 13 and the lubrication points (14) of the CVT. In this hydraulic circuit 9, the pressure regulators DBV usually work in the range from 0 to 6 bar at an operating pressure of 8 bar.

The primary pulley 3 comprises a pair of beveled sheaves on an input shaft 10. One of the sheaves, e.g. the primary sheave, is movable in an axial direction along the input shaft 10 while the other one of the sheaves, e.g., the secondary sheave, is fixed to the input shaft 10.

The secondary pulley 4 comprises a pair of beveled sheave on an output shaft 10. One of the sheaves, e.g. the secondary sheave, is movable in an axial direction along the output shaft 11 while the other one of the sheaves, e.g. the primary sheave, is fixed to the output shaft 11.

Figure 2:
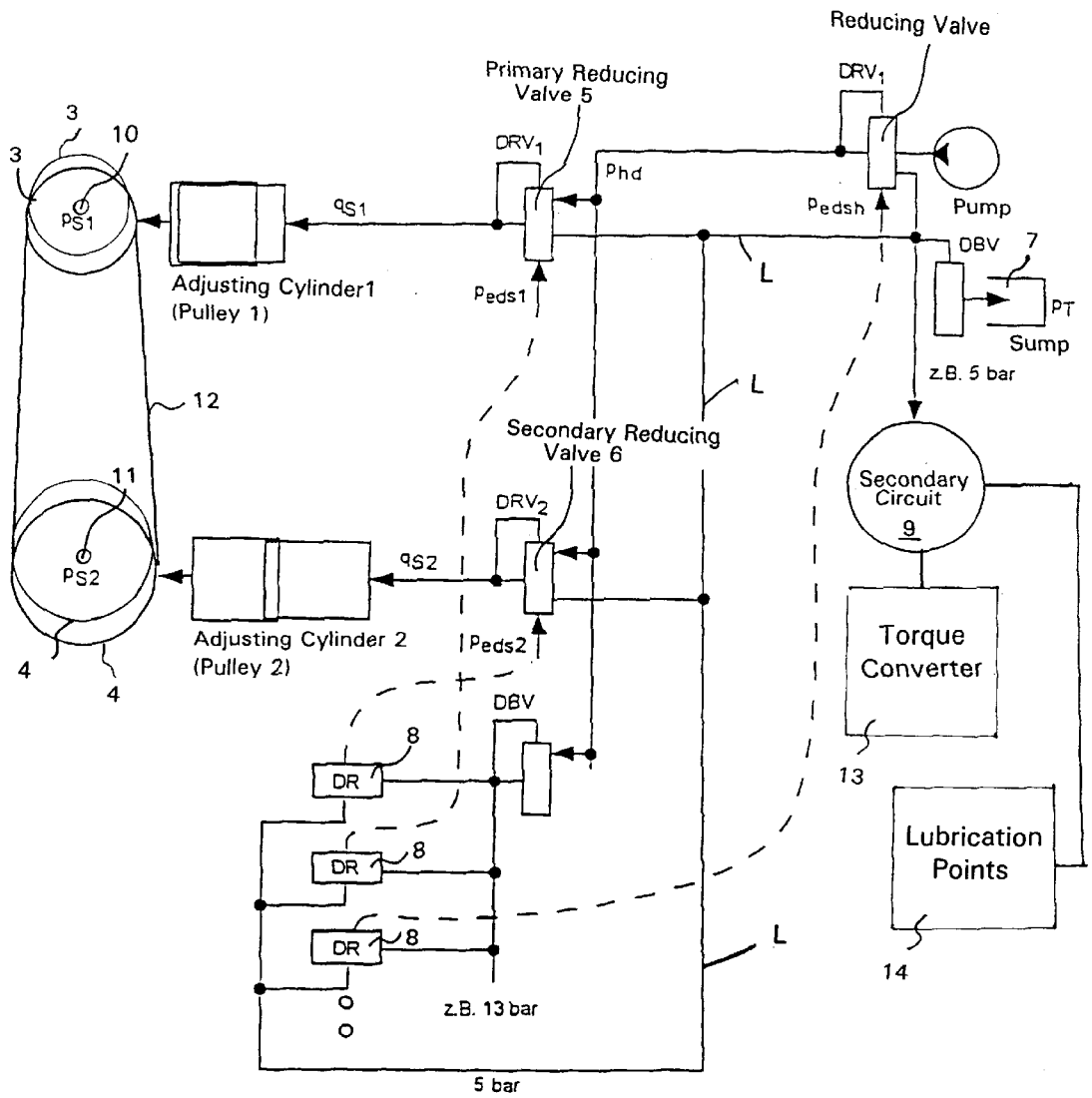
FIG. 2 is an analogous diagram of a closed hydraulic circuit designed according to the invention.

FIG. 2, like FIG. 1, shows diagrammatically, and only in a simplified representation, a closed hydraulic circuit in which the leakage flows from the adjusting cylinders 1 and 2, respectively, for the primary pulley pair 3 and secondary pulley pair 4, as well as the individual pressure-regulating valves DBV, are no longer returned to the lubricant sump 7, but are directly supplied to the secondary circuit 9, via a designated line L, so that said leakage flows for the torque converter 13 and lubrication points 14 of the transmission can be used directly or, arbitrarily, in a constant-pressure system. The former pressureless, vented circuit, therefore, is converted to a closed system with a constantly regulated pressure of about 5 bar. The working range of the pressure regulators DBV is preferably approximately 5 to 11 bar, the minimum contact pressure at said values amounting to about 5 bar. The leakage flows of both the secondary pulley pair 4 and primary pulley pair 3, together with the pressure regulators DBV (which as a function of pressure and temperature can amount to 1.5 liters per pressure regulator) are delivered directly to the secondary circuit 9.

What is claimed is:

1. A device for controlling a continuously variable automatic transmission driven by an input unit having a first and second pulley pairs, the first pulley pair mounted on an input shaft and the second pulley pair mounted on an output shaft and a belt drive provided between the first and second pulley pairs for transferring drive therebetween, the first pulley pair comprising a primary sheave which is adjustable in an axial direction and a stationary secondary sheave and a first adjusting cylinder with a leakage flow coupled to the primary sheave of the first pulley pair, and the second pulley pair comprising a stationary primary sheave and a secondary sheave which is adjustable in an axial direction and a second adjusting cylinder with a leakage flow coupled to the secondary sheave of the second pulley pair: and the device having electromagnetic actuators and hydraulic pressure regulating valves for determining a pressure level of the first and second adjusting cylinders;

wherein a hydraulic circuit, which includes the pressure-regulating valves and the first and second adjusting cylinders, comprises a closed hydraulic circuit which has a constantly regulated pressure, and the leakage flow from the first and second adjusting cylinders and leakage flow from the pressure-regulating valves are supplied directly to a constant pressure hydraulic circuit, and the constant pressure hydraulic circuit includes both a hydrodynamic torque converter and lubrication points of the transmission.

2. A device for controlling a continuously variable automatic transmission driven by an input unit having a first and second pulley pairs, the first pulley pair mounted on an input shaft and the second pulley pair mounted on an output shaft and a belt drive provided between the first and second pulley pairs for transferring drive therebetween, the first pulley pair comprising a primary sheave which is adjustable in an axial direction and a stationary secondary sheave and a first adjusting cylinder with a leakage flow coupled to the first pulley pair, and the second pulley pair comprising a stationary primary sheave and a secondary sheave which is adjustable in an axial direction and a second adjusting cylinder with a leakage flow coupled to the second pulley pair; and the device having electromagnetic actuators and hydraulic pressure regulating valves for determining a pressure level of the first and second adjusting cylinders;

wherein a hydraulic circuit, which includes the pressure-regulating valves and the first and second adjusting cylinders, comprises a closed hydraulic circuit which has a constantly regulated pressure, and the leakage flow from the first and second adjusting cylinders and leakage flow from the pressure-regulating valves are supplied directly to a constant pressure hydraulic circuit.

3. The device for control of a continuously variable automatic transmission according to claim 2, wherein the constant pressure hydraulic circuit supplies pressurized fluid to a hydrodynamic torque converter.

4. The device for control of a continuously variable automatic transmission according to claim 2, wherein the constant pressure hydraulic circuit supplies pressurized fluid to lubrication points of the transmission.

5. The device for control of a continuously variable automatic transmission according to claim 2, wherein the constant pressure hydraulic circuit supplies pressurized fluid to both a hydrodynamic torque converter and lubrication points of the transmission.

6. The device for control of a continuously variable automatic transmission according to claim 2, wherein the pressure regulating valves have an operating range of between about 5 bar to about 11 bar.

7. A device for controlling a continuously variable automatic transmission driven by an input unit having a first and second pulley pairs, the first pulley pair mounted on an input shaft and the second pulley pair mounted on an output shaft and a belt drive provided between the first and second pulley pairs for transferring drive therebetween, a first adjusting cylinder with a leakage flow coupled to the first pulley pair to control operation of the first pulley pair, and a second adjusting cylinder with a leakage flow coupled to the second pulley pair to control operation of the second pulley pair, and the device having hydraulic pressure regulating valves for controlling a pressure level of the first and second adjusting cylinders;

wherein a hydraulic circuit, which includes the pressure-regulating valves and the first and second adjusting cylinders, comprises a closed hydraulic circuit which has a constantly regulated pressure, and the leakage flow from the first and second adjusting cylinders and leakage flow from the pressure-regulating valves are supplied directly to a constant pressure hydraulic circuit.

8. The device for control of a continuously variable automatic transmission according to claim 7, wherein the constant pressure hydraulic circuit supplies pressurized fluid to a hydrodynamic torque converter.

9. The device for control of a continuously variable automatic transmission according to claim 7, wherein the constant pressure hydraulic circuit supplies pressurized fluid to lubrication points of the transmission.

10. The device for control of a continuously variable automatic transmission according to claim 7, wherein the constant pressure hydraulic circuit supplies pressurized fluid to both a hydrodynamic torque converter and lubrication points of the transmission.

11. The device control of a continuously variable automatic transmission according to claim 7, wherein the pressure regulating valves have an operating range of between about 5 bar to about 11 bar.

\* \* \* \* \*